Figure 1:
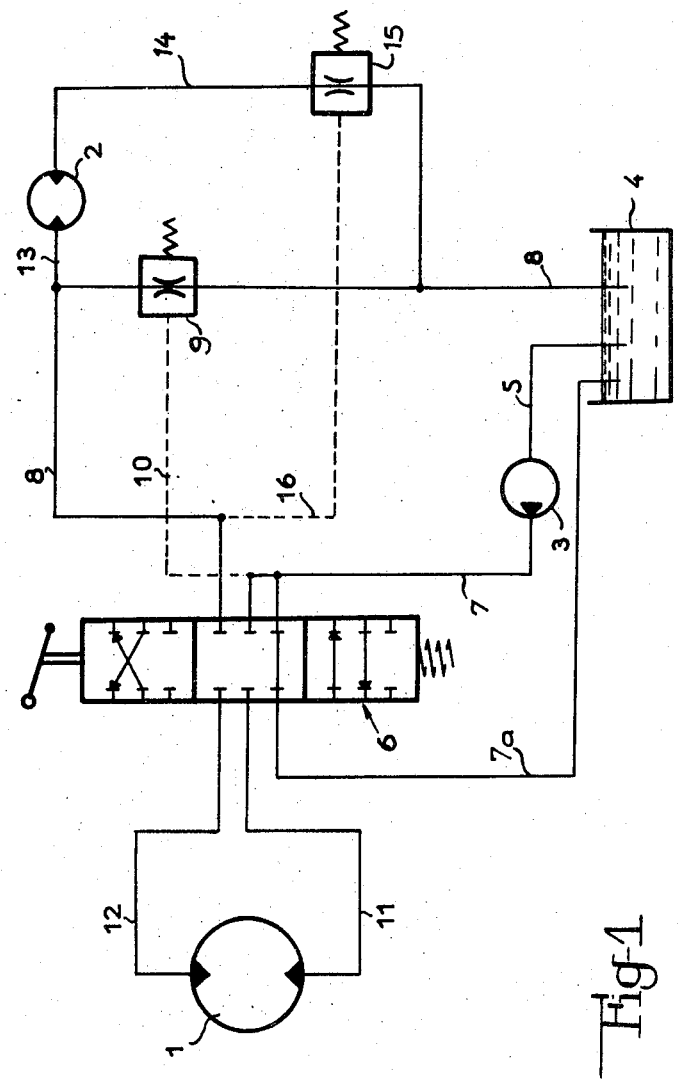

United States Patent

Praddaude

[15] 3,664,127
[45] May 23, 1972

[54] HYDRAULIC POWER TRANSMISSIONS

[72] Inventor: Pierre A. Praddaude, Crepy-en-Valois, France

[73] Assignee: Societe Anonyme Poclain, (Oise), France

[22] Filed: June 5, 1970

[21] Appl. No.: 43,831

[30] Foreign Application Priority Data

June 11, 1969 France..................................6919398

[52] U.S. Cl. ..........................................................60/53 R
[51] Int. Cl..............................................................F16d 41/00
[58] Field of Search ...................................................60/53 R

[56] References Cited

UNITED STATES PATENTS

| | | | |
|---|---|---|---|
| 2,370,526 | 2/1945 | Doran | 60/53 C |
| 2,599,450 | 6/1952 | Henning | 60/53 R |
| 2,804,016 | 8/1957 | Moore | 60/53 R X |
| 3,188,996 | 6/1965 | Thompson | 60/53 R X |
| 3,421,389 | 1/1969 | Fauchere | 60/53 R X |

*Primary Examiner*—Edgar W. Geoghegan
*Attorney*—Ward, McElhannon, Brooks & Fitzpatrick

[57] ABSTRACT

The present invention relates to a hydraulic power transmission constituted by two groups of hydraulic motors by at least one source of pressurized fluid feeding the motors of the first group, while, concomitantly, the motors of the second group are driven by their shaft, and by a first speed limiter arranged on the delivery conduit of the first group of motors, wherein the motors of the second group having a "free wheel" function and being connected to ensure this function, a conduit connects the delivery of the first group of motors to the feed of the second group of motors and is connected upstream of the first speed limiter, while a second speed limiter is arranged downstream of the point of connection of the conduit, in the irrigation circuit of the motors of the second group.

3 Claims, 2 Drawing Figures

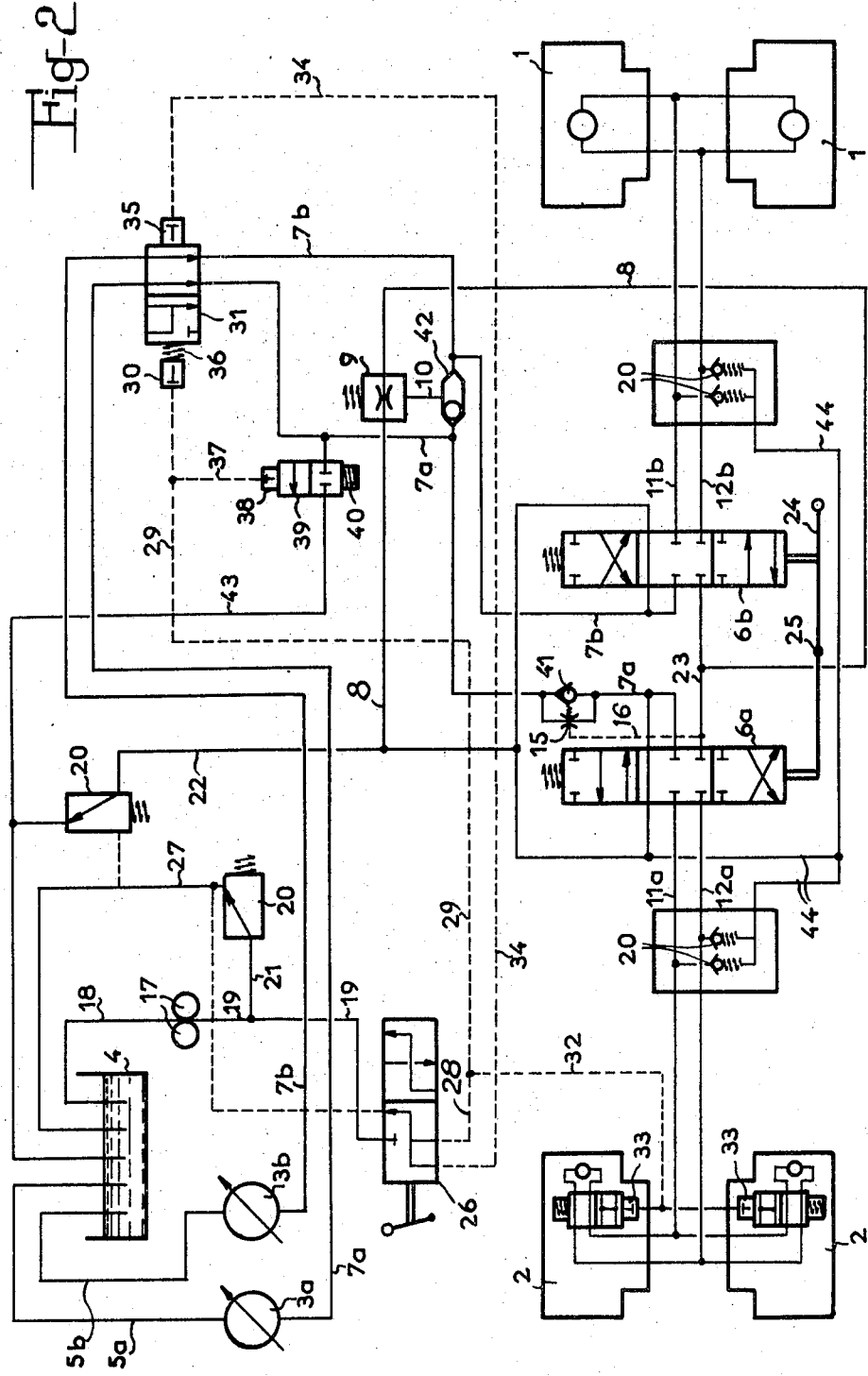

HYDRAULIC POWER TRANSMISSIONS

The present invention relates to hydraulic power transmission comprising hydraulic motors provided with a "free wheeling" device.

In the field of hydraulic power transmission, various types of devices are known which enable a hydraulic motor to be momentarily placed in a position in which it is rotated under the sole effect of the outer torques applied to the shaft of the motor.

For convenience of language, it will be said that such a motor is provided with a "free wheel." An embodiment of a motor provided with a free wheel is furthermore described in French Pat. application No. 139,700 of 13.2.68.

The characteristic of a hydraulic motor provided with a "free wheel" is, that when it is connected for this function, there is irrigation of the motor, i.e. there is circulation of a fluid in the motor. The fluid may be only at a low pressure, since it does not serve to drive the motor, but is used essentially for ensuring the cooling of the motor while the movable members of said motor, such as the pistons, are in motion. Of course, the irrigation fluid is also used as lubricant.

In actual hydraulic transmission, it happens that, in certain configurations, certain motors effectively carry out their role as motor, while certain others, arranged in the "free wheel mode," are concomitantly driven by their shaft, and therefore need to be irrigated.

The object of the invention is to permit the irrigation of the motors provided with a "free wheel" by the fluid delivered by the motors effectively carrying out their role as motors, while ensuring the limitation of the speed of rotation of these latter motors, this being done for reasons of safety.

The invention also has for its object a hydraulic power transmission constituted by two groups of hydraulic motors, by at least one source of pressurized fluid feeding the motors of the first group while the motors of the second group are concomitantly driven by their shaft, and by a first speed limiting device arranged on the delivery conduit of the first group of motors.

With the motors of the second group having a "free wheel" function and being connected to ensure this function, a conduit connects the hydraulic fluid from the delivery or discharge side of the first group of motors to the feed or inlet side of the second group of motors and is connected upstream of the first speed limiter, while a second speed limiter is arranged downstream of the point of connection of the conduit, in the irrigation circuit of the motors of the second group.

According to a preferred embodiment, the second speed limiter is arranged on the delivery conduit of the second group of motors.

Moreover, the two speed limiters are advantageously "controlled," the first by the pressure of the supply fluid of the motors of the first group, the second by the pressure of the fluid delivered by the motor of said first group.

The invention will be described in greater detail with reference to the accompanying drawings, in which:

FIG. 1 is a schematic view of a transmission according to the invention;

FIG. 2 schematically shows the application of the invention to a particular embodiment.

Referring now to the drawings, FIG. 1 shows a motor (or a group of motors) 1 arranged to carry out its role as motor, and a motor (or a group of motors) 2 provided with a "free wheel" and at present connected to ensure its free wheel function. Moreover, when the motor 1 is fed, the shaft of the motor 2 is driven concomitantly.

The motor 1 is fed by a pump 3 connected to the fluid tank 4 by a suction conduit 5 and to a slide valve 6 by a conduit 7.

The delivery conduit 8 of the motor 1 leads from the slide valve 6, from the same side as that of the conduit 7 to the tank 4 through a speed limiter 9.

As is known, the speed limiter 9 is advantageously controlled by the pressure of the fluid of conduit 7, a conduit 10 to this end connecting the conduit 7 to the speed limiter 9.

Furthermore, opposite conduits 7 and 8, conduits 11 and 12, respectively are arranged on the other side of the valve 6 and connect said valve 6 to the motor 1, so that the motor 1, by means of the valve 6, which is a three way slide valve, may as is also known, be fed in order to rotate in one direction or the other. A return conduit 7a connects the valve 6 to the tank 4 and is placed in communication with the conduit 7 when the slide of the valve 6 is arranged so that the motor 1 is not fed.

Finally, a conduit 13 connects the motor 2 to the delivery conduit 8 of the motor 1 and is connected to the conduit 8 upstream of the limiter 9, while a conduit 14 departs from motor 2 and returns to the tank 4.

A speed limiter 15 is arranged in one of the two conduits 13, 14, in the present case, and preferably in conduit 14.

This limiter 15 may be controlled similarly to the limiter 9. To this end, a conduit 16 connects with conduit 8, to which it is connected upstream of the speed limiter 9, to the speed limiter 15.

The mode of transmission described hereinafter is applied to the transmission corresponding to the drive in translation of a vehicle, such as a public works machine. The example that will be described is shown in FIG. 2, in which the same references designating members similar to those of the preceding description are used.

The machine is provided with front and rear wheels capable of being respectively driven by the groups of motors 1 and 2, each group comprising two motors fed in parallel. Two variable discharge pumps 3a, 3b draw from a fluid tank 4 through conduits 5a, 5b and deliver through conduits 7a, 7b. Moreover, a pump 17 with gears for example, used in particular for supplying fluid at a pressure, known as "control" pressure draws from the tank 4 through conduit 18 and delivers through conduit 19.

Different discharge valves 20 are arranged in known manner on the conduits 11a, 11b, 12a, 12b which are capable of conveying the feed fluid for the motors 1 and 2. Additionally, a valve 20 is arranged on the delivery side of the pump 17 through a shunt conduit 21; and a further valve 20 is arranged on the conduit 22 connecting the speed limiter 9 to the tank 4. These discharge valves are judiciously calibrated on the one hand to avoid too high pressures being produced in the delivery conduits of the pumps and supply conduits of the motors and valves, and on the other hand to maintain a low but not non-existing pressure in certain conduits returning to the tank 4, such as conduit 22 for example.

Two slide valves 6a, 6b are connected hydraulically by a conduit 23 and mechanically by a single control lever 24 coupled to each of the slides and articulated about a fixed axis 25, and are therefore capable of directing the feed fluid for motors 1 and 2 so that said latter rotate in the same direction in order to move the vehicle forward or rearward, or even to remain stationary.

Furthermore, a two-position valve 26 enables the fluids delivered by pumps 3a and 3b to be directed, either from pump 3a towards motors 2, and from pump 3b towards motors 1, or from pumps 3a and 3b towards motors 1. This valve is fed with fluid under "control pressure" through conduit 19, and permits, through conduit 27, the return of the fluid in conduits 28, 29, 32 and 34 to the tank 4. It directs the control fluid through conduits 28 and 29 towards the ram 30 for controlling the slide of a two-position valve 31, through conduits 28 and 32 towards rams 33 for controlling the "free wheeling" of the motors 2, through conduit 34 towards the ram 35 for controlling the slide of the valve 31, the action of the ram 35, and a spring 36 being opposite that of the ram 30. Moreover, the fluid that may be present in the conduit 29 is conveyed through a conduit 37 towards the ram 38 of the slide of a valve 39 and then operates against the action of a spring 40.

It will furthermore be noted that the valve 31 ensures, according to its position, either the junction of the deliveries of the two pumps 3a and 3b, directing the sum of the discharges towards the single conduit 7b, then towards the motors 1; or the isolation of said deliveries of the pumps, directing the discharge of the pump 3a, through conduit 7a, through a non-return valve 41, towards the motors 2, and the discharge of the pump 3b through conduit 7b, towards the motors 1.

Moreover, as is known, a "shuttle" valve 42, constituted by a ball contained in the body of the valve, ensures the control of the speed limiter 9, by means of the conduit 10 by the highest of the pressures of the fluids of the conduits 7a, 7b.

It will also be noted that, in one position, the slide of the valve 39 places the part of the conduit 7a located downstream of the valve 31 in communication with a conduit 43 for return to the tank 4, when the valve 31 connects the discharges of the two pumps 3a and 3b to the conduit 7b. In the second position of the valve 39, which is moreover shown in FIG. 2, the continuity of the conduit 7a is ensured while said conduit 7a is isolated from conduit 43, each pump 3a, 3b having its delivery discharge directed towards each of the groups of motors 2, 1.

Finally, the discharge valves 20 arranged on conduits 11a, 11b, 12a, 12b are connected to the tank 4 by a conduit 44, which is moreover connected to conduit 22.

Concerning the transmission shown in FIG. 1, it is assumed that the motor 2, which, in certain cases of use, acts as a motor with convenional feed, and which is not shown in this mode, is shown connected to the "free wheel" circuit. The pump 3 draws the fluid from the tank 4 through conduit 5 and delivers through conduit 7 into one of conduits 11 or 12, 11 for example. The exhaust fluid is delivered by the motor 1 through conduits 12 and 8.

If the motor 1 were isolated from motor 2, the speed limiter 9 would be sufficient to limit the rotational speed of motor 1 thus to ensure the desired operational safety. However, the fluid delivered by motor 1 through conduit 8 is judiciously reused for the irrigation of the "free wheel" of the motor 2. As the "free wheel" arrangement offers little or no resistance to the passage of a fluid, it is then necessary to resort to the connection according to the invention in order to create a hindrance to the flow of the fluid in the irrigation circuit. This is the object of the speed limiter 15.

In this way, a simple, compact and economical installation is obtained for dealing with the problem of the irrigation of motor 2, without losing the advantage of the limitation of speed on the motor 1.

The position of the limiter 15 is preferably chosen to be in the delivery conduit 14 in order to maintain a certain pressure in the motor 2. As for the controls of the speed limiters 9 and 15, they have different actions from one another. For limiter 9, when the pressure drops in conduit 7, as when the motor 1 is racing and operates as a pump for example, it is necessary to limit the delivery discharge at 9; in other words, the lower the pressure in the conduit 7, the more the conduit 8 is restricted by the limiter 9 and the more the pressure increases in the conduit 8. On the contrary, it is necessary to increase the loss of load in the conduit 14, when the pressure is high in the conduits 8 or 16, in order to ensure a substantially constant irrigation.

If reference is now made to FIG. 2, two very different types of operation are obtained.

According to a first mode of utilization, the valve 26 is arranged in the position shown in FIG. 2, and valves 6a, 6b place conduits 7a and 11a, and 7b and 11b, respectively, in communication. As the pumps are in operation, the control pressure reaches the valve 26 through conduit 19, the fluid being stopped at the inlet of the valve 26. Moreover, the fluid present in the rams 30, 33, 35 and 38 returns to the tank 4, through conduit 27, so that the motors 2 are arranged their "motor" functions, and the valves 31 and 39 are in the position of FIG. 2. The pressurized fluid coming from pumps 3a, 3b through conduits 7a, 7b, is directed towards valves 6a, 6b then the motors 2 and 1, through conduits 11a, 11b, respectively. The fluid, after having traversed the motors, returns through conduits 12a, 12b then 23 and 8, and traverses the speed limiter 9 in order to escape, through the second part of conduit 8, the conduit 22 and a valve 20, towards the tank 4. Moreover, it will have been noted that the limiter 9 is controlled by the highest of the feed pressures prevailing in the feed conduits 7a, 7b of the two groups of motors. In this configuration, the motors 1 and 2 are fed independently and drive the vehicle at a certain speed.

If it is desired to increase this speed, the two pumps are made to discharge in the group of the motors of the wheels of one of the axles, in the motors 1 for example, motors 2 of the wheels of the other axle then being set on their "free wheel" function.

To this end, the valve 26 is arranged in its second position opposite to that shown in FIG. 2. The "control" pressure reaches only conduit 28, then, through conduits 29, 37 and 32, reaches rams 30, 38 and 33. Additionally, the fluid of the ram 35 is evacuated through conduits 34 and 27 towards the tank 4, or to the atmosphere. This is followed by the displacement, towards the right, of the slide of the valve 31 which directs towards the sole conduit 7b the sum of the discharges of the two pumps 3a, 3b and isolates the second part of the conduit 7a from the first part of the same conduit. The valve 39 moreover places this second part of the conduit 7a in communication with conduit 43. Finally, the pistons of the jacks 33 arrange the motors 2 so that they ensure their "free wheel" function.

The pressurized fluid coming from pumps 3a, 3b is directed through conduits 7a and 7b, then 7b only, towards the valve 6b. With the valves 6a and 6b assumed to be in their previous position, the motors 1 are fed through conduit 11b and deliver, through conduits 12b, 23 and 12a, into motors 2. The fluid irrigates the motors 2, then through conduit 11a reaches the valve 6a which it traverses. The transmission that has already been described in FIG. 1 is then found to occur, the fluid leaving the valve 6a being able to traverse only the limiter 15 since it is stopped at the non-return valve 41.

It is of course understood with this embodiment, that the motors 2 have a role of "motor," and then a "free wheel" function. When they are used in this "free wheel" function, the motors 2 are driven by the vehicle, itself driven by those wheels which are driven by the motors 1, and motors 2 are irrigated simply by the fluid which is delivered by motors 1. Finally, the safety of the speed limiter on the vehicle thus driven is maintained, even when the motors 2 are operating "free wheel."

What is claimed is:

1. Hydraulic power transmission comprising: two groups of motor means, each including at least one hydraulic motor, at least one source of pressurized fluid feeding the motor means of the first group, a first speed limiter disposed in a delivery conduit from said first group of motor means, a second conduit connecting the delivery conduit of the first group to the feed of the second group of motor means and connected to said delivery conduit upstream of the first speed limiter, wherein the motors of the second group may be driven by their shaft and have a free wheel function; a second speed limiter disposed downstream of the point of connection of said second conduit and said delivery conduit to permit irrigation of the motor means of the second group, the first speed limiter being controlled by the pressure of the feed fluid of the motor means of the first group.

2. Hydraulic power transmission comprising: two groups of hydraulic motors, at least one source of pressurized fluid feeding the motors of the first group, a first speed limiter disposed in a delivery conduit of said first group of motors, a second conduit which connects the delivery of the first group of motors to the feed of the second group of motors and is connected upstream of the first speed limiter, wherein the motors of the second group may be driven by their shaft and have a free wheel function; a second speed limiter disposed downstream of the point of connection of said second conduit and said delivery conduit to permit irrigation of the motors of the second group; said second limiter being disposed on the delivery conduit of the second group of motors, and the second speed limiter being controlled by the pressure of the fluid delivered by the motors of the first group.

3. Hydraulic power transmission comprising: two groups of hydraulic motors, at least one source of pressurized fluid feeding the motors of the first group, a first speed limiter disposed in a delivery conduit of said first group of motors, a second conduit which connects the delivery conduit of the first group of motors upstream of the first speed limiter and to the feed of the second group of motors, wherein the motors of the second group may be driven by their shaft and have a free wheel function; a second speed limiter disposed downstream of the point of connection of said second conduit and said delivery conduit, and permitting irrigation of the motors of the second group; the first speed limiter being controlled by the pressure of the feed fluid of the motors of the first group; said second speed limiter being disposed in the delivery conduit of the second group of motors; the second speed limiter being controlled by the pressure of the fluid delivered by the motors of said first group.

* * * * *